Oct. 31, 1944.  E. J. DOWDEN  2,361,826
SPEED REGISTERING DEVICE
Filed Oct. 28, 1940  6 Sheets-Sheet 1
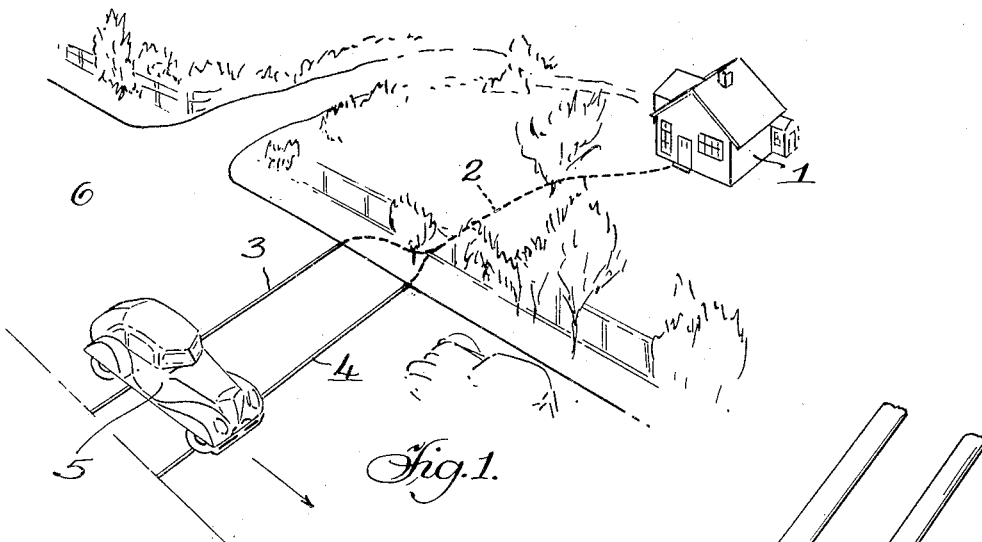
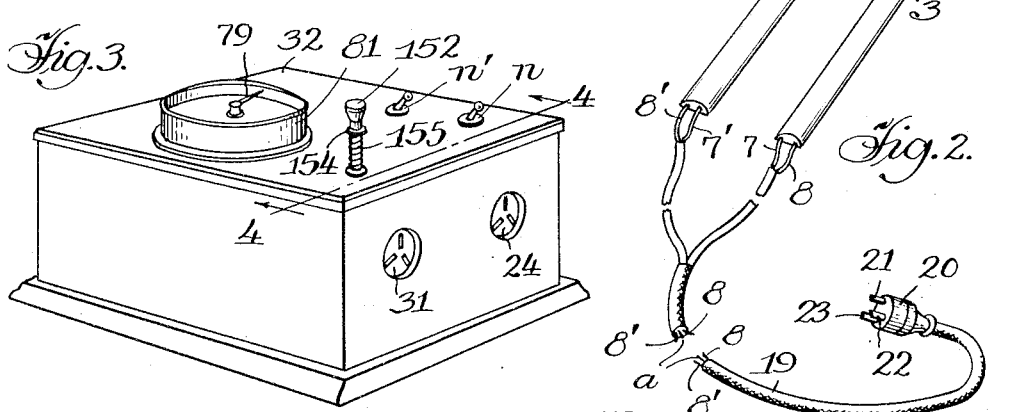
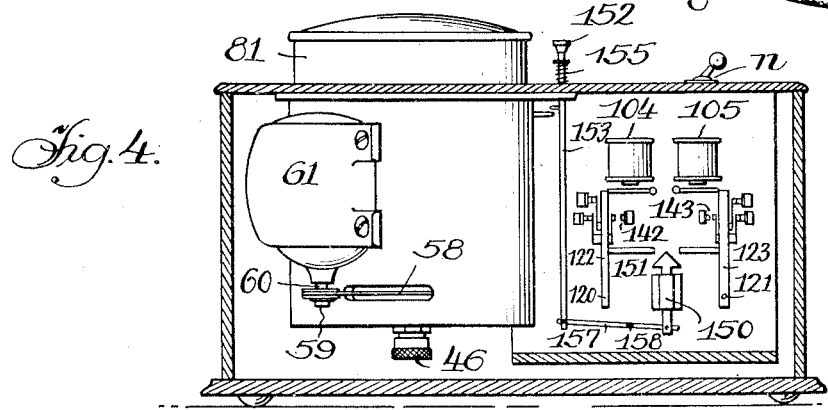
INVENTOR.
Ernest J. Dowden,
BY Parkinson & Lane
Attys.

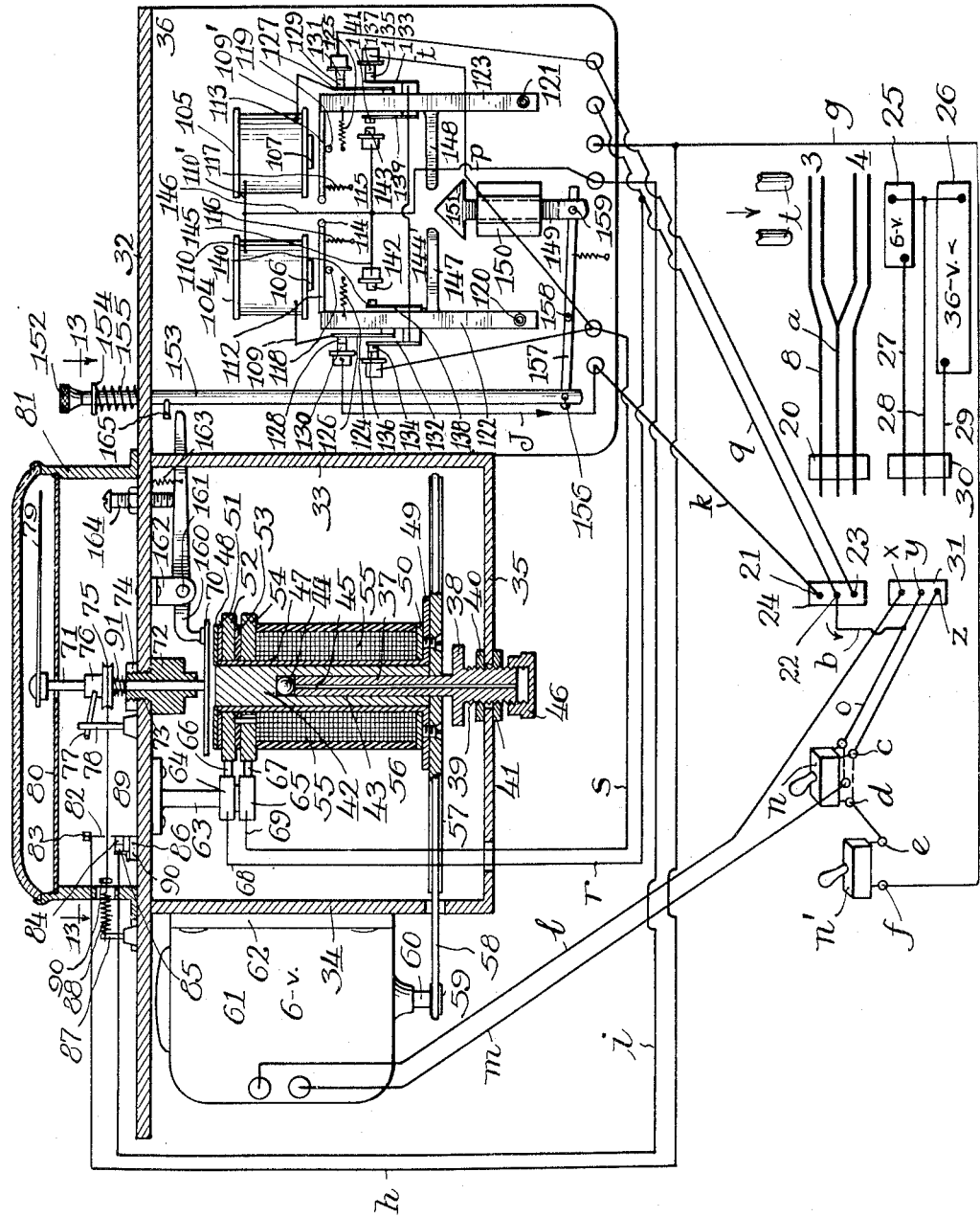

Oct. 31, 1944.     E. J. DOWDEN     2,361,826
SPEED REGISTERING DEVICE
Filed Oct. 28, 1940     6 Sheets-Sheet 3
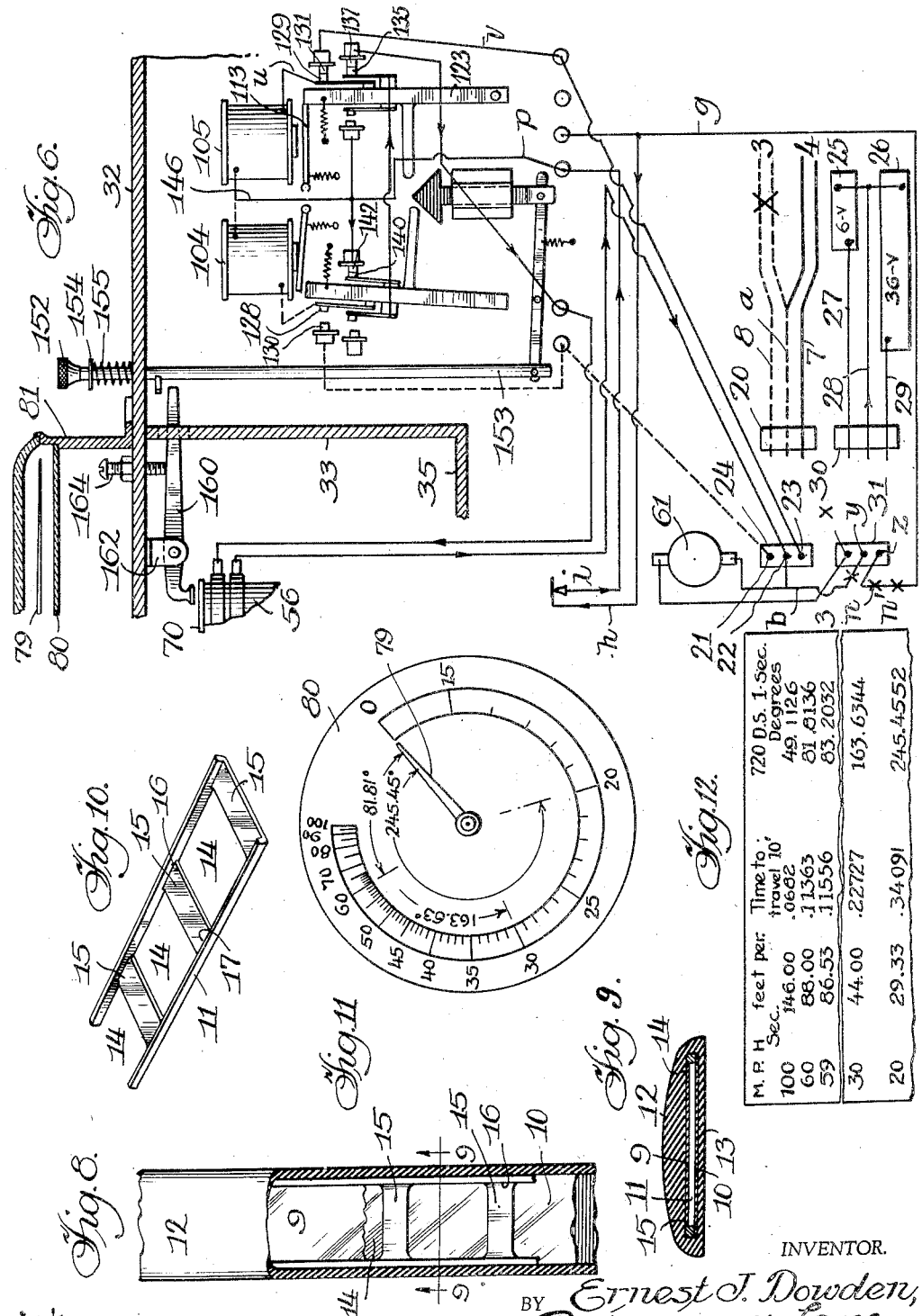
INVENTOR.
Ernest J. Dowden,
BY Parkinson & Lane
Attys.

Oct. 31, 1944.  E. J. DOWDEN  2,361,826
SPEED REGISTERING DEVICE
Filed Oct. 28, 1940  6 Sheets-Sheet 4
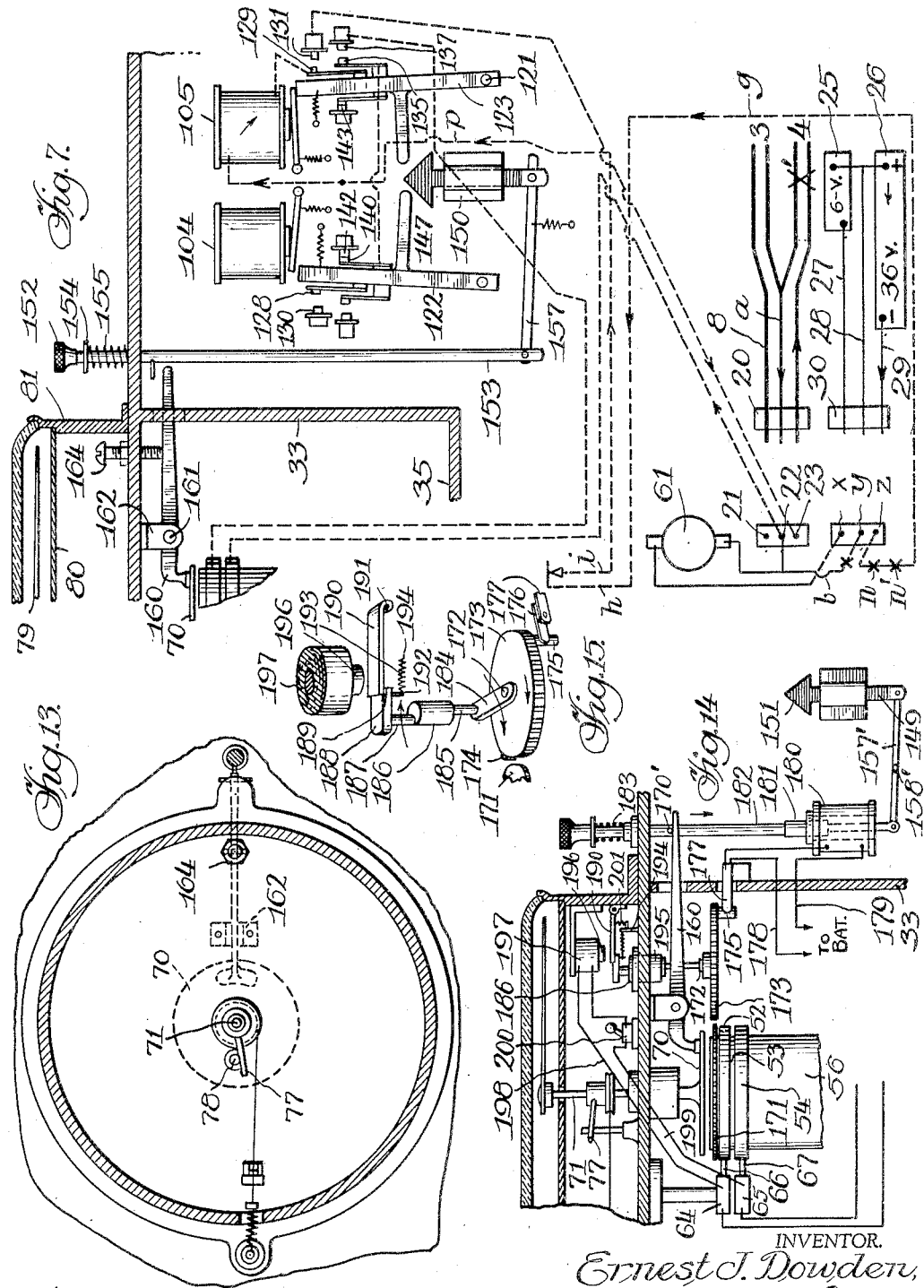
INVENTOR.
Ernest J. Dowden,
BY Parkinson & Lane
Attys.

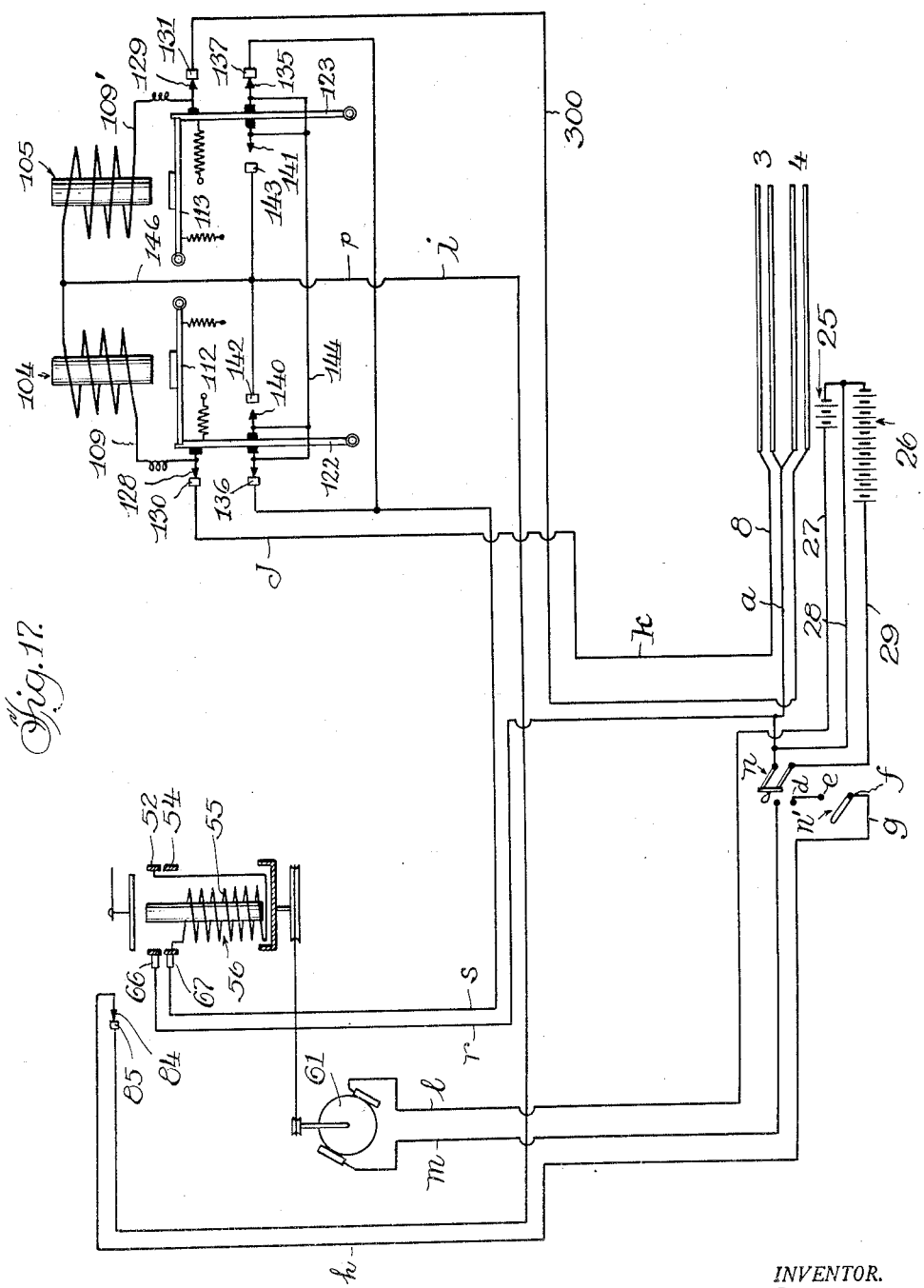

Patented Oct. 31, 1944

2,361,826

UNITED STATES PATENT OFFICE 2,361,826

SPEED REGISTERING DEVICE

Ernest J. Dowden, Spirit Lake, Iowa

Application October 28, 1940, Serial No. 363,179

24 Claims. (Cl. 161—18)

This invention relates to apparatus for registering speeds of various devices and more particularly automobiles. While, for illustrative purposes, I have described the invention in connection with automobiles, I wish it understood that it may be used on any type of device to which it may be adapted. It is primarily intended for indicating the speeds of passing vehicles and is arranged for indicating the correct speed of such vehicles or the like in miles per hour. In carrying the invention into practice when used in connection with automobile speeds, a pair of road switches will be positioned on the highway at a predetermined distance from each other. When the front wheels of the automobile contact the first switch the registering apparatus is instantly started in operation and when the front wheels reach the second switch the registering apparatus is instantly stopped, the apparatus registering the speed in miles per hour the automobile was travelling in passing from the first switch to the second switch.

Among the objects of the invention is to carry out the above purposes electrically, the speed of electricity being so great that the starting and stopping of the registering apparatus will be effected instantly upon contact of the front wheels with the first and second road switches respectively.

A further object is to provide a symmetrical arrangement of certain of the parts so that the registering apparatus will operate correctly, regardless of which longitudinal direction along the highway the car is proceeding.

Another object is to provide a device of the kind described that can be contained in a compact form, is simple in construction, can be manufactured at small cost, can register without error the speeds of all vehicles in thick or heavy traffic, is portable and can be used on any type of constructed highway, either hard surfaces, gravel or dirt.

A still further object is to make use of a short measuring distance with extreme accuracy at all speeds.

A further object is to provide a constant speed driving means which operates a constant speed electromagnet, with means for energizing the winding of said electromagnet at the proper time and cause a magnetic clutch to grip the electromagnet and rotate therewith and deenergize the winding and release the clutch at the proper instant to register the speed of the passing vehicle.

A still further object is to provide a braking means for the clutch to instantly stop the rotation of the clutch upon deenergization of the rotating electromagnet.

Another object is to provide novel spaced apart road switches to be successively contacted by one of the front wheels of an automobile or other vehicle.

A further object is to provide novel electric circuits, hook-ups and controls in a device of the kind described, to enable instant operation of the parts and correct registering of speeds.

A still further object is to provide a novel rotatable electromagnet and associated parts.

An additional object is to provide novel means, both manual and automatic, for resetting the various parts of the apparatus after a vehicle has passed by the two spaced road switches, so that the apparatus can be easily and quickly made ready to register the speed of another vehicle.

Another object is to provide a safety switch to prevent operation of the speed registering pointer beyond a certain point and to prevent damage to parts in case the pointer be turned too great an amount due to failure of the second road switch to close, or for any other cause.

A further object is to provide means for automatically returning the pointer to the zero reading position after the speed has been registered and noted, and recorded if desired, and the braking means for the electromagnet clutch momentarily released.

A still further object is to so proportion the speed of rotation of the electromagnet and the distance between the two spaced apart road switches that the indicia on the registering dial can be properly placed thereon, and the speeds of the vehicle being tested be properly registered.

An additional object is to provide a speed registering apparatus capable of being portably positioned at any desired distance and location with relation to the road switches so that the operators of the device may be hidden from sight from the vehicle being tested, or not as desired.

Another object is to provide novel means for testing the accuracy of the registration indicated on the main registering apparatus by comparing the same with the reading on a testing apparatus in which the distance travelled of the vehicle being tested, the time elapsing between the road switches, and the circumferential degrees to be travelled by the indicator for a known speed are known and used for correctly setting the contacts of the testing apparatus.

Other objects, advantages and capabilities will later more fully appear.

My invention further resides in the combination, construction and arrangement of parts illustrated in the accompanying drawings, and while I have shown therein preferred embodiments I wish it understood that the same are susceptible of modification and change without departing from the spirit of my invention.

In the drawings—

Figure 1 is a perspective view of an automobile passing over a pair of spaced road switches which are wired to register the speed of the car from a distant and unobserved point.

Fig. 2 is a perspective view of a pair of road switches and wiring therefrom to plug into a speed registering apparatus, the road switches forming part thereof.

Fig. 3 is a perspective view of a cabinet within which is housed speed registering apparatus embodying my invention.

Fig. 4 is a vertical transverse section taken on the line 4—4 of Fig. 3.

Figure 16:
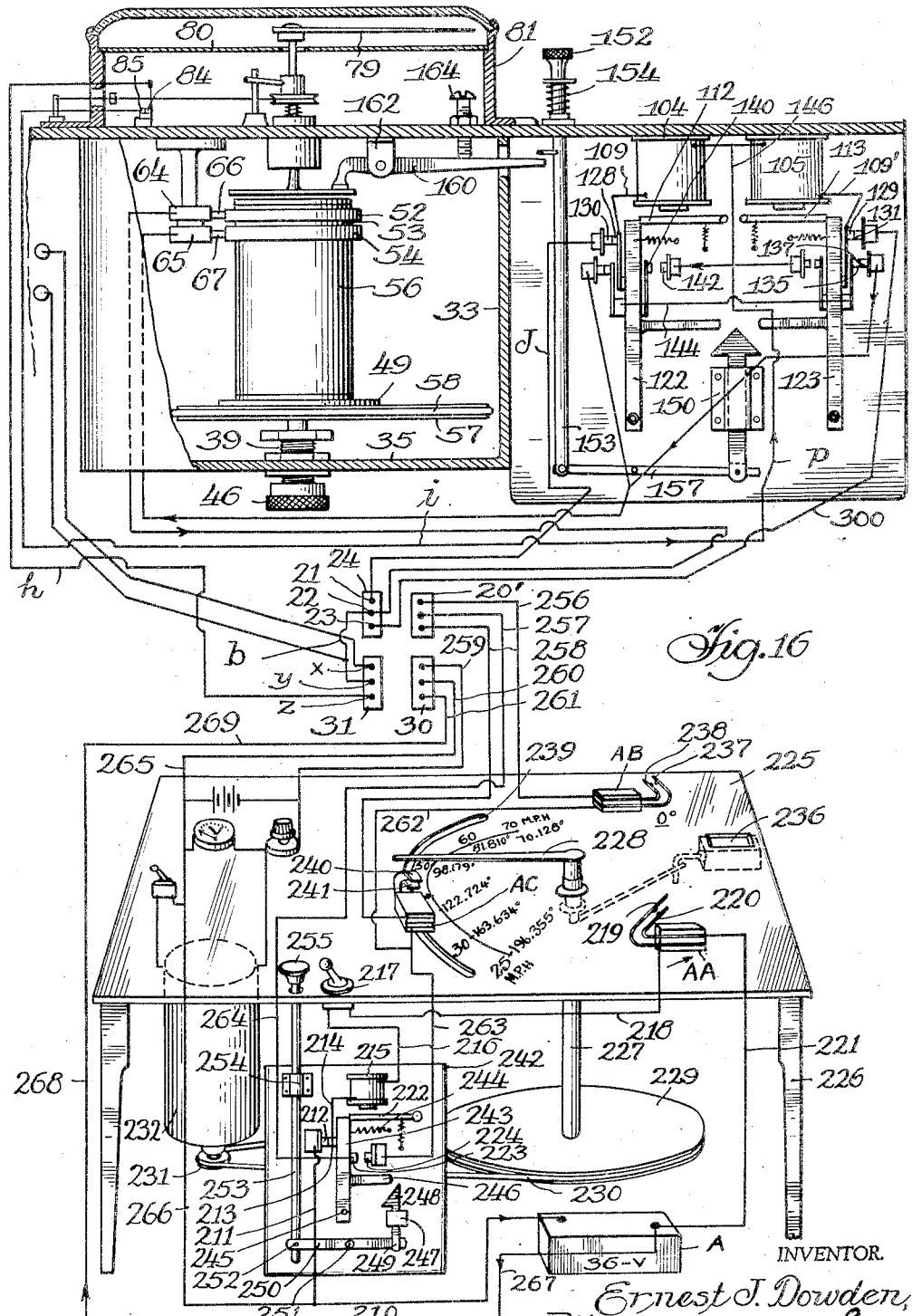

Fig. 5 is a vertical transverse section through the rotary electromagnet and indicating parts of my novel registering apparatus, and showing to one side but in a plane closer to the eye the movable parts for controlling the parts first mentioned, and the electric circuits for operating the same, the parts being shown in their position just before the electrical impulse passes through the circuits from closing of the first road switch.

Fig. 6 is a fragmentary sectional view showing a portion of the movable parts of Fig. 5 moved to a position for rotating the rotatable electromagnet just at the instant one of the front tires of the automobile being tested has arrived upon the first road switch and caused electric contact therein and closed some of the electric circuits.

Fig. 7 is a view similar to Fig. 6 but showing the movable parts in the position for releasing the magnetic clutch from the rotatable electromagnet and stopping movement of the clutch and the indicator just at the instant one of the front tires has arrived upon the second road switch and caused electric contact therein.

Fig. 8 is a fragmentary plan view of a portion of one of the road switches, partially in section and partially in elevation.

Fig. 9 is a vertical, transverse section on the line 9—9 of Fig. 8.

Fig. 10 is a fragmentary perspective view of the insulating separator of the road switches, which normally separates the upper and lower contact strips.

Fig. 11 is a face view of the speed registering dial and the indicator thereabove, with the indicator standing at zero.

Fig. 12 is a fragmentary view of a table showing the feet per second, the time to travel ten feet, and the number of degrees of the indicator on the dial, for the various miles per hour.

Fig. 13 is a horizontal transverse section on the line 13—13 of Fig. 5.

Fig. 14 is a fragmentary vertical section through the registering dial and associated parts, showing automatic means for resetting the magnetic clutch control circuits and operating parts for a new operation.

Fig. 15 is a perspective detail of part of the automatic resetting apparatus.

Fig. 16 is a vertical view partly in section, partly diagrammatic and partly in perspective of a combined speed registering apparatus and testing apparatus for testing the accuracy of the speed registering apparatus.

Fig. 17 is a wiring diagram of the electrical features of my speed registering device.

Referring more in detail to the drawings, there is shown in Fig. 1 for illustrative purposes only and not for limiting the scope of the invention, one form of my invention in which the speed registering apparatus is located out of sight in a building 1 and connected by suitable wires 2 to the spaced apart road switches 3 and 4 which are spaced apart any desirable distance for which the apparatus is proportioned, such distance in the present case being ten feet. In the present invention one of the front tires of the automobile 5 first contacts the first road switch 3 and closes an electric circuit which energizes a stationary electromagnet, moves an armature trigger to break the first mentioned circuit and instantly close a second circuit and energize a constant speed rotating electromagnet to close a magnetic clutch into gripping contact with the rotating electromagnet and start into rotation at a constant speed an indicator arm over a dial. This rotation of the rotating electromagnet and the indicator arm continues until one of the front wheels of the car contacts the second road switch 4 and closes the same, which in turn opens the circuit which previously had energized the rotary electromagnet, and releases the magnetic clutch from the rotating electromagnet, which clutch is instantly stopped from rotation by a brake, and instantly stops further movement of the indicator.

Because of the operating circuit controlling devices on a panel or other support in the main cabinet being arranged in a symmetrical manner with relation to each other, the apparatus will work the same no matter which longitudinal direction along the highway 6 the car is proceeding.

As seen in Fig. 2 road switch 3 is provided with two wires 7 and 8, and road switch 4 is provided with two wires 7' and 8', one wire of each pair being connected to an upper strip or contact, and the other wire of each pair being connected to a lower strip or contact of the respective road switches. Said upper and lower strips or contacts are each of thin flexible steel or the like, copper coated to increase their ability to conduct electrical current. As seen in Figs. 8 and 9 the upper strip 9 and lower strip 10 of each road switch are longitudinally slidably mounted on the respective sides of a rubber separator 11, which three parts are in turn so molded or otherwise embedded in a rubber elongated body having the resilient crown portion 12 and the more rigid base portion 13. The upper and lower strips are longitudinally slidable with relation to the rubber separator 11 and the surrounding rubber so that when desired the road switch may be rolled upon itself longitudinally for transportation or storage. This is further facilitated by the upper and lower strips being made in relatively short lengths connected together longitudinally by wires, but of such lengths that it will be impossible for the two front tires of the automobile to ever both be between the two spaced ends of the strips. This insures that one or the other of the two front tires will force the upper and lower strips together and bring them into electrical contact while the tire passes thereover. In this connection it is pointed out that the rubber separator is formed with openings 14 of such length as to permit the upper strip and the lower strip to be brought together in contact therethrough by one or the other of the two front tires. As seen in Figs. 8 and 9 the upper strip 9 fits loosely between the upstanding flanges 16—17 of the rubber separator, and the lower strip 10 lies loosely along and beneath the side bars of the separator to enable longitudinal movement therealong, to permit the bending and rolling of the road switch longitudinally as aforesaid.

As seen in Fig. 2 the wires 8 and 8' leading from the road switches 3 and 4 are insulated from each other and pass through a cable 19 to a plug 20, and the two wires 7 and 7' are joined together where they enter the cable 19 and pass therethrough as a common or single wire a as shown at the break in said cable in Fig. 2, it being understood that common wire a is insulated in the cable from both wires 8 and 8'. Wires 8, 8' and a are connected to the three contact fingers 21, 22 and 23 of plug 20, which fingers when the device is in operation are plugged into complemental openings in the socket 24 in the cabinet shown in Fig. 3. The electric power is supplied by two batteries 25 and 26, the former of which is six volts and the latter thirty-six volts. Leading from these two batteries are the three wires 27, 28 and 29, the wire 28 being a common wire to both of these batteries, these three wires leading to a plug 30 provided with three projecting contact fingers similar to those in plug 20 of Fig. 2, the plug from the battery wires being plugged into the socket 31 of the end of the cabinet shown in Fig. 3.

With the road switches in position on the highway and spaced ten feet apart, and the road switch plug 20 and the battery plug 30 being plugged into the sockets 24 and 31, the apparatus is ready to be operated to selectively close and open the circuits as described later herein.

Referring to Fig. 5 the framework for supporting the speed registering apparatus comprises a top 32, side walls 33, 34, a bottom wall 35 and a control board 36 for supporting certain of the controlling and operating parts. Extending upwardly from bottom 35 is a shaft or bearing post 37, of brass or other non-magnetic material, and formed near its lower portion with a flange 38, below which flange is a threaded portion 39 which extends through an opening in bottom 35, there being tightly secured against the top and lower face of said bottom disk-like brass nuts 40 and 41 which are formed with threads to cooperate with the threads on the threaded portion 39. By rotating these nuts in an appropriate manner the upper and lower nuts will be tightly forced against the bottom to rigidly hold the shaft 37 in upstanding position, and with such vertical adjustment as may be required.

Rotatably mounted on the bearing post 37 is a round steel or iron core 42 formed with a cylindrical bore 43 of a size to rotatably receive the bearing post. Rotatably positioned between the top of bearing post 37 and the metal forming the top wall of bore 43 is an anti-friction ball 44. A longitudinal opening 45 extends throughout the length of the bearing post to permit grease to be forced therethrough from an oil or grease cup 46 of brass and threaded onto the lower end of the bearing post to lubricate ball 44 and the full length of bore 43 of core 42 as the core rotates on the post.

Surrounding the iron or steel core 42 is a wrapping of paper or other electric insulating material 47. Threadedly fixed to the top and bottom of core 42 are a round brass disk 48 and metal disk 49, respectively, there also being fixed above disk 49 an insulating disk 50 contacting the wrapping 47 and covering the disk 49. Fixed around the wrapping 47 and below the disk 48 to cover the same is an insulating disk 51, which with the previously described parts forms a spool. Metal disk 48 is preferably brass. Mounted immediately around wrapping 47 and below and against insulating disk 51 is a brass disk 52 which when connected to one end of the winding wire (later described) around wrapping 47 acts as a collector ring. Immediately below collector ring 52 and in contact with wrapping 47 is a disk 53 of electric insulating material. Immediately below disk 53 and contacting wrapping 47 is a brass disk 54 which when connected to the other end of the winding wire around wrapping 47 acts as a further collecting ring, these two collecting rings when connected to the respective ends of the winding wire 55 wound around the spool described above, and when connected with an exterior circuit serves to energize said winding of the electromagnet 56 for a purpose later described.

Fixed by screws, bolts or other fastening means, to the lower side of disk 49 is a grooved pulley 57, which is caused to rotate together with the electromagnet 56 by reason of belt 58, driven by pulley 59 fixed to shaft 60 which is the driven shaft of electric motor 61. Electric motor 61 is mounted upon a suitable bracket 62 and is so wired and constructed as to give it ample power for the purpose intended, and it has contained within itself a speed controlling arrangement which will give to the motor, and to the electromagnet 56 driven thereby, a constant and regular revolving speed at all times. When the motor 61 is put in rotation by the application of electric current, a constant rotating speed will be maintained by the governor contained therewithin.

Referring to Fig. 5 it is pointed out that brass or other non-magnetic material is used for the sides 33 and 34, which may be posts or pipes of which preferably four are positioned, one at each corner, with any suitable non-magnetic material therebetween for panel or sides of the casing. The bottom 35 is secured to said posts or pipes and is also brass or other non-magnetic material, which is also true of the top 32 likewise secured to said posts. The insulated copper wire forming the winding 55 of the rotatable electromagnet may be of any desired diameter and length, and is wrapped any desired number of turns around the insulated spool. It is to be understood that this copper wire is insulated at all points around the spool, with its respective ends connected independently to the brass collector rings 52 and 54.

It will thus be seen that when an electric current of the correct voltage and amperage is applied to the brass collector rings 52 and 54, the result will be that the iron or steel core 42 will instantly become magnetized and will accordingly tend to draw toward itself any adjacent metal subject to magnetism.

Secured to the under face of top 32 is an electric insulated bracket 63 in the lower portion of which at suitably spaced positions are two brush holders 64 and 65 within which are slidably mounted the carbon brushes 66 and 67, any suitable means, such as springs or the like, serving to constantly urge these carbon brushes so that their inner ends will constantly electrically contact the collector rings 52 and 54 respectively.

Electrically fixed to brushes 66 and 67 are wires 68 and 69 respectively, leading to circuits later described.

The brass posts 33 and 34, which are attached to the brass top plate 32, and brass bottom plate 35, thus make a rigid framework of brass or other non-magnetic material. It is also to be understood that suitable gearing may be used in place of belt 58 if desired, for imparting a constant speed of rotation to the electromagnet 56. It is also seen that no iron or steel or other material subject to magnetism is in close proximity to this revolving magnet.

Just above the rotating electromagnet 56, and normally spaced a slight distance above the brass disk 48 and the upper end of the steel or iron core 42 (which latter is depressed a little below the level of the upper face of disk 48 to insure good clutching action), is an iron or steel disk 70, having fixed thereto by threads or other suitable means an upstanding iron or steel shaft 71, rotatably mounted in the brass bearing block 72 which has an upstanding threaded neck 73 threaded into an opening through the brass top 32, and which neck has threaded thereon above top 32 a brass nut 74 by which these parts may be fixed in top 32. Fixed to shaft 71 a small distance above nut 74 is a brass sheave or pulley 75 having an upstanding brass collar 76 in which is secured a protruding brass pin 77 which at the proper time strikes upstanding post or pin 78 for a purpose later explained.

At the upper end of shaft 71 is fixed an indicator arm or hand 79 which is securely fastened to the shaft to rotate therewith. Immediately below the indicator hand 79 is a dial 80 appropriately secured within casing 81, said casing surrounding the parts just described as well as other parts to be later described. Dial 80 has a central aperture to receive shaft 71. The face of dial 80 is shown in Fig. 11, the significance of the indicia on the face of said dial being later more fully explained.

In Fig. 5 is shown a safety switch 82 consisting of an upstanding arm 83 of springy material, and which arm may be stationarily fixed either at its top or bottom end. Preferably the top end of said arm 83 is stationary so as to permit the bottom end of said arm to swing to the right as viewed in Fig. 5 when opening contact 84 of said safety switch, and to swing to the left under the action of the resiliency of said arm 83 when closing said switch. Said safety switch also comprises the stationary contact 85 which is mounted upon a fixed insulating block 86 which in turn is fixed upon the top 32. Also fixed to the top plate 32 and at some distance to the left of safety switch 82 as viewed in Fig. 5, is an upstanding post 87 to the top of which is secured one end of a coil spring 88, the opposite end of the coil spring being secured to a strong cord or string 89, which in turn is extended around the circumferential groove of the pulley 75 so that as the pulley is turned the cord will be wound therearound and the coil spring 88 extended. Fixed to the end of cord 89 is a button or stop 90 so positioned that at the right time said button will contact the resilient arm 83 of safety switch 82 to open the latter, it being understood that cord 89 passes through an opening in resilient arm 83 without touching the walls of said opening, said opening being of a size to permit passage of the cord therethrough but not the button 90, as will be later more fully explained. Should the pulley 75 be rotated too great a distance in a speed registering direction, button 90 will open safety switch 82 to prevent any damage to the parts. As soon as the magnetic clutch is released and the brake (later described) also released, coil spring 88 will rotate pulley 75 to bring the indicator to the zero position and also again close safety switch 82.

The mounting of shaft 71 in the brass block 72 is such that the said shaft may be movable in this block both in a rotational as well as vertical direction to have free rotation and movement therein. Downward movement of shaft 71 is effected by energizing the coils of the rotary electromagnet 56 to draw downwardly into clutching position the iron or steel clutch 70 which, as will be understood from the preceding description, is in the form of a disk fixed to the bottom of rotatable shaft 71 so that said disk will rotate with the rotating electromagnet when the latter is energized, and move upwardly away therefrom under the action of a coil compression spring 91. Spring 91 encircles shaft 71 and is held under the desired amount of compression between the lower face of pulley 75 and the upper face of the upwardly projecting neck of block 72, thus normally holding shaft 71 and clutch 70 in an elevated position except when they are drawn downwardly by the magnetism created in core 42 of the rotating electromagnet 56 when energized.

It is to be noted in Fig. 5 that the turning of shaft 71 can be accomplished only until the stopping pin 77 strikes stop post 78. As explained earlier herein, coil spring 88 will be stretched when cord 89 winds around pulley 75. The end of the cord 89 away from the spring 88 is wound around pulley 75 in such manner that when this pulley revolves in a counterclockwise direction the cord will wind upon the pulley and in turn will lengthen the coil spring 88. It will thus be seen that the energy of the extended coil spring 88 will tend to turn the pulley 75 and the shaft 71 and the clutch disk 70 all in a clockwise direction and move the stop pin 77 against the stop post 78, at which time the indicator hand will register zero. This will take place unless some other force greater than the energy of the spring 88 causes the mentioned parts to rotate in a counter-clockwise direction as, for example, when the rotating electromagnet is energized and the clutch disk 70 is rotating in a counter-clockwise direction therewith.

In Fig. 11 is shown the face of the calibrated dial 80, it being kept in mind that different calibrations may be used in accordance and in proportion with the length of the measuring distance between the two road switches. For illustrative purposes only and without limiting the invention, in this application I have used the distance of ten feet for the measuring distance between the two road switches and the dial calibrations will be in accordance therewith. Also the circle degrees per second travelled by the indicator hand 79 will be in accordance with the ten foot measuring distance referred to. It will be understood, however, that any desired measuring length may be used, the proper speed in revolutions of the indicator hand and the calibrations on the dial being calculated and proportioned to correspond therewith.

From the preceding description it will be understood that the shaft of motor 61 is rotating at a steady and constant speed, which is also true of the electromagnet 56, which by virtue of belt 58 and pulleys 59 and 57 also rotates at a steady and constant speed as long as the motor is running. This steady rotation of the electromagnet is further facilitated by mounting of the same upon the ball 44 and vertical shaft 37. All of the parts adjacent to the electromagnet 56, with the exception of the disk 70, are made of brass or other non-magnetic material, whereby they are not affected by the magnetism of the core 42 of the electromagnet 56.

Electric current of the proper voltage and amperage from any desired source is applied through the brushes 66, 67 to the collector ring 52, being either input of electric current or output, a collector ring 54 serving for the opposite. It will be understood that when the circuit from the source of electrical energy just referred to is closed the following takes place:

The revolving electromagnet 56 having its iron or steel core 42 protruding at its uppermost end and in close proximity to the iron or steel disk 70, becomes magnetized instantly and without loss of time, and draws the disk or magnetic clutch 70 firmly against the disk 48, overcoming the resistance of the coil spring 91. The combined magnetic force from the core 42 with the friction between the disk 70 and the disk 48 forms a friction and magnetic clutch which instantly and firmly holds the two disks 70 and 48 together. The disk 48 being part of the rotating electromagnet 56 will instantly and positively carry with it in its counter-clockwise rotation the clutch disk 70.

From the foregoing it is seen that the pulley 75, the stop pin 77, and the indicator 79 are all part of and attached firmly to the shaft 71 which at its lower end is fixed to the clutch disk 70, and that all of these parts rotate together in perfect unison with the rotary electromagnet throughout the time that the latter is energized by having a current passed through its winding. It has also been shown that the electric motor 61 is of constant speed, and that it is controlled by a built-in governor and other mechanism commonly in use for such purpose. It will be understood that by pulley (or gears if desired) ratio between the motor 61 and the pulley 57, the desired and constant speed in revolutions of the electromagnet 56 can be had. The revolutions per second of this magnet 56 must be in proportion to the calibrations used on dial 80 and also in proportion to the measuring distance used.

Having, for the purposes of this application, decided upon a measuring distance of ten feet, I will, therefore, use a speed of one hundred and twenty (120) revolutions per minute or two (2) revolutions per second for the constantly rotating electromagnet 56. It is to be understood, however, that these figures are used only for purposes of illustration, as they, as well as any other, may be used as desired in actual operation of this device.

In the dial 80 of this application, the calibrated figures are based on the above speed of two (2) revolutions per second, and a measuring distance of ten feet. The indicator shaft 71 is centrally located therein, and the indicator 79 will, when the electromagnet 56 is energized, rotate at the same speed as the constantly and uniformly rotating electromagnet, that is, two revolutions per second. The circular dial 80 containing 360 degrees in its circumference, the indicator 79 will travel the complete circle of 360 degrees in one-half of one second.

The fragmentary portion of a table, or list of calculations, shown in Fig. 12, shows how the various quantities for the various items figure out. For example, when based on a measuring distance of ten feet and a speed of rotation of the electromagnet 56 of two revolutions (or 720 degrees) per second, the automobile travelling at 60 miles per hour will travel 88.00 feet per second, and will travel ten feet in .11363 second, and the indicator hand 79 will travel 81.8136 degrees on the dial (starting from zero) while the car is travelling said ten feet. The table shown in Fig. 12 can readily be figured in the same way to include and show the various quantities for the items referred to above for any or all speeds in miles per hour. Only a few have been shown in Fig. 12 for the sake of brevity. Therefore, the calibration or figure 60 is placed on the dial at 81.8136 degrees from the starting point on the circle and in a counter-clockwise direction therefrom. All other speeds or calibrations from 15 to 200 miles per hour are so calibrated and spaced accordingly on the dial.

It should be understood that if a greater length than ten feet is desired for the measuring distance, the revolutions of the rotating electromagnet would be lessened per second as, for example, if a measuring distance of twenty feet was desired, rather than ten feet, then the calibrations or figures on the dial would remain as they are, but the revolutions of the rotating magnet would be only one revolution per second, or one-half of that used with a ten foot measuring area. For all other desired measuring lengths the magnet 56 in revolutions per second would be changed accordingly.

When it is kept in mind that the action of electric current is instantaneous it will be easily seen that by means of the present invention the indicator hand 79 does start moving around the dial and at the proper time stop instantaneously. The indicator hand 79, the shaft 71 and the disk 70 are all lightly but securely made, and because of this lightness of construction and its freedom of action it only requires the force of magnetism through the magnet 56 to start it in motion. Therefore, within a period of time so short as to be beyond the comprehension of the human mind, the indicator 79 is started in motion after the first road switch 3 has been closed by the weight of a front tire thereon.

It will now be shown by what means the several electric circuits between the road switches and the device and the power source are closed and opened by effecting the various described operations.

In Fig. 5 is shown the electric control board or panel 36, upon which are mounted the two stationary electromagnetic coils 104 and 105, it being understood that panel 36 is made of insulating material. The details of coils 104 and 105 are unnecessary except to point out that each comprises an elongated circular core of steel or iron 106 and 107, encircling which is an insulating cover with an insulating disk at each end to form an insulating spool around said core, with an insulated copper wire securely coiled around said spool. This wire may be of any size and number of turns desired for best results. The opposite ends of this insulated copper wire are shown at 109 and 110 and 109′ and 110′.

Spaced a suitable distance below the lower end of iron or steel cores 106 and 107 are armature latches 112 and 113 respectively, which are pivotally mounted at 114 and 115 at their adjacent ends to any suitable support carried by panel 36. Pull coil springs 116 and 117 are secured one to each of the armature latches 112—113 at one end, and to the panel 36 at the other. These pull coil springs 116—117 normally urge the armature latches downwardly against the stops 118—119 fixed to the panel and made of non-magnetic material.

When an electric current is applied to the winding of either of the stationary electromagnets 104 and 105 the iron or steel core 106 or 107, depending on which of the electromagnets is supplied with current, will become magnetized and draw upwardly to itself the armature latch 112 or 113 against the action of the spring 116 or 117, and hold it there until that circuit is opened and the current stopped.

Pivotally mounted by pins 120 and 121 of non-magnetic material extending at right angles to the panel 36, are the upstanding arms 122 and 123 made of insulating material so as to be non-conducting of electricity and also unaffected by magnetism. The arms 122 and 123 are thus free to move sidewise at their upper ends, unless restrained by some force from so doing. These arms are normally urged inwardly toward each other by springs 124 and 125. Arm 122 near its upper end is provided with a resilient arm 126, while arm 123 is likewise provided with a similar resilient arm 127, to each of which arms is attached an electrical contact member 128 and 129 respectively. Resilient contact holders 126 and 127 are insulated with relation to the arms 122 and 123 by reason of the insulating nature of said arms.

Mounted on panel 36 are stationary contacts 130 and 131 connected to circuits later more fully described. Movable contacts 128 and 129 make electrical contact with the stationary contacts 130—131, and break such contact at intervals as hereinafter explained. Also attached to arms 122 and 123 at positions intermediate of their ends, are resilient arms 132—133, which carry at their free ends contact members 134—135 respectively. Associated with movable contact members 134—135 are stationary contact members 136—137 each secured to panel 36, which are in or out of electrical contact with movable contacts 134—135 respectively, depending upon the position of the arms 122—123. Arms or strips 126, 127, 132 and 133 are resilient so that the contacts carried thereon will press against their corresponding stationary contacts to insure good electrical contact. These resilient arms or strips are formed from tempered spring steel and covered with a copper plating to facilitate the conduction of electricity thereover. The copper coating also prevents rust or corrosion upon the steel.

Fixed to the inside faces of the pivoted arms 122 and 123 are resilient arms or strips 138 and 139 respectively, which are similar in nature to the resilient arms or strips 126, 127, 132 and 133. Each of strips 138 and 139 has fixed at its upper end a movable contact member 140 and 141 respectively. Also fixed to panel 36 are the stationary contacts 142 and 143 respectively, which are connected to electrical circuits hereinafter described. As will be later more fully understood, the movable contacts 140 and 141 will make or break contact with the stationary contacts 142 and 143, depending upon the position of the pivoted arms 122 and 123. A wire 144 electrically connects strips or arms 132 and 133. Also a wire 145 electrically connects stationary contacts 142 and 143 with each other and with the wire 146 leading to the stationary electromagnets 104 and 105. Arms 122 and 123 are formed with the inwardly extending integral porjections 147 and 148, which at their inner ends are spaced apart a sufficient distance so that when said arms and projections are in the position shown in either of Figs. 6 and 7, due to releasing of one or both of the armature latches 112 and 113, they may be pushed outwardly to reset arms 122 and 123 to their original position shown in Fig. 5. This resetting action is effected by the bar 149 moving vertically in keeper 150, this bar having at its upper end a head 151 provided with inclined edges so that upward movement of head 151 will push one or both of arms 122 and 123 outwardly depending upon which one or both of these arms may have been moved inwardly by tripping of one or the other of the armature latches 112 and 113.

Vertical movement of resetting bar 149 is effected by a push button 152 mounted at the top of a rod 153, which rod has fixed thereto a collar 154, between which collar and the top 32 is mounted a spring 155 which normally holds rod 153 in an upward position. Rod 153 is pivotally connected at 156 to lever 157 pivoted at 158 to panel 36, and at its other end pivoted at 159 to the bottom of bar 149. As will be understood, pushing downwardly upon head 152 of rod 153 will cause bar 149 and head 151 to move upwardly whereby the inclined edges of head 151 will move one or the other of arms 122 and 123 outwardly as explained above.

The stationary contacts 130, 131, 136, 137, 142 and 143, and also stop pins 118 and 119 (the latter two for stopping downward movement of armature latches 112 and 113) are made of brass or other non-magnetic material. The parts 151, 150, 149, 157 and rod 153 are preferably made of material that is both insulating against the passage of electricity as well as being non-magnetic in nature.

As seen in Fig. 5 the clutch disk 70 together with shaft 71, at the completion of the speed registration which is the instant that the winding 55 of rotary electromagnet 56 is deenergized, is forced upwardly by the coil spring 91 and against the brake or holding arm 160 which is pivoted at 161 on the bracket 162, which in turn is fixed to the top member 32. It is to be understood that the holding arm or lever 160 and the bracket 162 are made of brass or other non-magnetic material. As viewed in Fig. 5 the holding arm or lever 160 is normally urged in a counter-clockwise direction by a tension coil spring 163 or other suitable means, which is secured at one end to the lever and at the other end to the top 32. The amount to which spring 163 may urge lever 160 in a counter-clockwise direction is adjustably controlled by a set screw 164 rotatably threaded through top 32, and provided with a lock nut for positively holding the set screw in any one of its adjustable positions. This enables the brake on the left-hand end of lever 160, as viewed in Fig. 5, to be so adjusted in height that this brake will immediately stop rotation of disk 70 as soon as the latter is released from the rotating electromagnet by upward pull of coil spring 91 upon deenergization of winding 55.

Fixed to the restoring rod 153 is a projection 165 which upon downward movement of this rod for restoring the control parts shown in the right-hand side of Fig. 5, will contact the free end of lever 160 to release the brake from clutch 70 to permit the indicator arm 79 to be swung to zero position by reason of the pull on cable 89 caused by coil spring 88.

In Figs. 14 and 15 are shown a modification of the means for restoring the parts that control the electric circuits for energizing the rotary electromagnet. In this modification a gear 171 is fixed near the upper end of the rotating electromagnet 56. Mounted upon the lower end of a shaft 172 is an idler gear 173 having an outwardly extended tooth 174 at one side and a downwardly extending trip finger 175 at the other side. As will be later understood, when gear 173 is moved edgewise a sufficient distance to bring its normal gear teeth into contact with the teeth of gear 171, this will cause rotation of gear 173 until the extended tooth 174 contacts with the teeth of gear 171, and forces gear 173 edgewise to the right as shown in Fig. 15 to bring trip finger 175 into position to, during rotation of gear 173, contact switch arm 176 and move it into contact with switch arm 177 and close the circuit through wires 178 and 179 leading to and from a battery at one part of the circuit and to and from an electromagnet 180, which through a solenoid core 181 causes downward movement of rod 182 and upward movement of bar 149 and tapered head 151 through lever 157' fulcrumed at 158' to restore the control parts described earlier herein. As soon as pin 175 moves away from switch finger 176 as later described, solenoid 180 will be deenergized and restore bar 149, and head 151 will be again moved downwardly and rod 182 upwardly under action of a coil spring 183. During this downward movement of rod 182 pin 170' will cause rotation of lever 160 in a clockwise direction to release the brake from the clutch 70 and reset the indicator arm to the zero position as described earlier herein.

As noted in Fig. 15, stub shaft 172 is mounted in the free end of arm 184, which arm at its other end is fixed to the projecting rod 185 which is eccentrically mounted upon the lower end of the shaft 186, which shaft at its upper end has eccentrically mounted thereon the rod 187 which is rotatably mounted in plate 188 having a shoulder 189 adapted to receive a latch 190 pivoted at 191 on any suitable means connected with the cabinet wall. Depending from plate 188 is a pin 192 to which is connected a coil spring 193 fixed at its opposite end to a stationary pin 194, so that when latch 190 is elevated and freed from plate 188 spring 193 will move said plate to the right and through the eccentric mountings cause arm 184 to swing to the left as viewed in Fig. 15 to cause engagement between gears 173 and 171.

As seen in Fig. 14, the shaft 186 is rotatably mounted in a stationary bearing 195 so that said eccentrically positioned pins 185 and 187 will upon rotation of shaft 186 through pull of spring 193 cause movement as described of arm 184. Upward movement of latch 190 is effected through the pull of a core 196 of an electromagnet 197 energized through wires 198, 199 receiving electric current through connection with brushes 67 and 66, a manual switch 200 being interposed for opening this circuit when desired.

Connected to the lower side of latch 190 is a pull spring 201 fixed at its other end to stationary pin 194. When electromagnet 197 is energized the same will pull the free end of latch 190 upwardly away from shoulder 139, thus freeing plate 188 to move to the right as viewed in Fig. 15 under action of spring 193 to move gear 173 edgewise to the left to engage gear 171, so that when the extended tooth 174 engages gear 171 it forces gear 173 in an edgewise direction to the right as viewed in Fig. 15, to bring finger 175, as gear 173 rotates, into position to close switch 176, 177 to energize electromagnet 180 and move the restoring head 151 upwardly to restore the control parts to position for a new operation. When gear 173 is moved edgewise to the left to engage gear 171, it will be understood that tripping pin 175 is moved to the left a sufficient distance not to engage switch 176, 177 until after the extended pin 174 has passed through the teeth of gear 171 and again moved gear 173 edgewise to the right as viewed in Fig. 15. This timing is such that the restoring of the control parts to their starting position will not occur until after the car has passed beyond the second road switch and the operator of this device had an opportunity to read and record, if desired, the speed of the passing car.

A suitable cabinet will house the framework and adjacent parts described above, except the road switches and wiring from the same to the cabinet.

To enable a better understanding of the main electrical circuits in my device, I have, in Fig. 17, illustrated a wiring diagram thereof. The reference numerals in Fig. 17, when considered in connection with corresponding reference numerals of similar parts in the other views, will enable a ready understanding of said circuits.

*Operation of electrical circuits*

The electrical circuits for operating the automatic restoring means shown in Figs. 14 and 15 have already been described above. The operation of the electrical circuits for the general operation of my improved registering apparatus will now be described.

Assuming plug 20 from the road switches, and plug 30 from the two batteries to be plugged into sockets 24 and 31 respectively, it being understood that the six volts battery 25 is for constantly rotating the electromagnet 56, and the thirty-six volt battery 26 is for giving the additional electrical force needed for positively and instantly operating the various control devices and circuits, and referring first to Fig. 5, we will consider that the front tires t are approaching in the direction of the arrow the first road switch 3. At this time the parts will be in the position indicated in Fig. 5.

Assuming next that one or the other of the front tires t of the automobile has closed the first road switch 3 as indicated at X in Fig. 6, and considering both Fig. 5 and Fig. 6, as the transition from Fig. 5 to Fig. 6 will take place instantly when the first road switch 3 is closed, it will be understood from Fig. 5 that at the instant of closing of the first road switch 3 in Fig. 6 the current will flow through the common wire a (see Fig. 2) through 22, through wire b, through connection y, through the battery and on through line 29, connection z, through connections c, d, e, f, through wires g and h, through safety switch 84, 85, through wires i, p, 146, electromagnet 104, through wire 109, switch 128, 130, through wires j and k, connection 21 and back through wire 8 to close the circuit to and from the first road switch 3. It will be understood that the current at first will not pass through electromagnet 105 for the reason that this is connected to the second road switch, which at the present instant is open because one or the other of the front tires has not yet reached it.

The effect of closing this first circuit described above is to energize stationary electromagnet 104 and cause the latch arm 112 to move upwardly free from the top end of arm 122, which arm under the action of pull spring 124 will move inwardly to the right as viewed in Fig. 5. This action has taken place as viewed in Fig. 6.

It should also be stated that the circuit from the six volt battery to the constantly rotating driving motor 61 proceeds through line 27, connection $x$, line $l$, through motor 61, line $m$, through switch $n$, line $o$, connection $y$, back to the battery 25, which latter circuit maintains continuous rotation of motor 61 which in turn, as described earlier herein, maintains constant rotation of the electromagnet 56.

The effect of energizing stationary electromagnet 104 and pulling armature latch 112 upwardly, thus permitting arm 122 to swing inwardly and open switch 128, 130, is that it renders the first road switch 3 dead and also closes switch 140, 142.

Tracing the next circuit it will be understood that switch 128, 130 is open and switch 140, 142 is closed. The current now flows from switch 140, 142 through wires $p$, $i$, through safety switch 85, 84, wires $h$, $g$, connections $f$, $e$, $d$, $c$, connection $z$, wire 29, through battery 26, wire 28, connection $y$, wire $b$, connection 22, through wires $q$, $r$, brush 66, wire 55, brush 67, wires $s$, $t'$, through switch 137, 135, through metal arm 133, wire 144, thence upwardly through metal arm 138 to switch 140, 142, thus completing the circuit which energizes wiring 55 of the rotating electromagnet 56 and energizing clutch disk 70, rotating the same and causing rotation of indicator arm 79 from the position as shown in Fig. 11 to whatever number indicating miles per hour are shown on the dial 80. It will be understood that the number indicating miles per hour over which the indicator arm 79 will stop, will be that speed indicated by the car passing between the first road switch and the second road switch as explained earlier herein.

This circuit last described, which energizes the winding of the rotating electromagnet 56, remains closed until one or the other of the front tires of the automobile closes the second road switch 4, which action will now be described. When one or the other of the front tires of the automobile closes the second road switch 4 as indicated at X' in Fig. 7 (it being remembered that the first road switch 3 is open or dead at such time), this will close the electric circuit now described. It will be remembered that at this time the switch 128, 130 is open and switch 140, 142 and switch 135, 137 are closed. Current now flows from X' (due to the second road switch being closed) in Fig. 7, but in order to show the passage of the electric current through the circuit now being described it will be necessary to trace it through Fig. 6, which is the condition of the parts just at the instant of closing of the second road switch.

Referring accordingly for the moment to Fig. 6 but considering the second road switch X', which is closed, it will be seen that the current now flows from X' though the common wire $a$, through connection 22, wire $b$, connection $y$, wire 28, through the battery, line 29, connection $z$, through switches $n$ and $n'$ (connections $n$ and $n'$ being shown diagrammatically for sake of convenience), through lines $g$, $h$, through the safety switch 84, 85 (see Fig. 5), through lines $i$, $p$, 146, stationary electromagnet 105 (it being understood that the current through electromagnet 104 is now dead because of the first road switch 3 being dead), through wire $u$, through switch 129, 131, wire $v$, connection 23, and back to X', which is the second road switch 4, thus completing the circuit.

The effect of this circuit is that the energization of the stationary electromagnet 105 raises the armature latch 113, thus permitting arm 123 to move inwardly, which has taken place as in Fig. 7, and open switch 129, 131, thus rendering the second road switch 4 dead. This inward swinging of arm 123 also opens switch 135, 137 and instantly deenergizes the rotating electromagnet 56, instantly stopping the indicator arm 79 at whatever speed has been registered on the dial from the passage of the car front tires from the first road switch to the second road switch. This deenergization of electromagnet 56, as has been explained earlier herein, releases the clutch disk 70 to move upwardly against the brake at the end of lever 160, thus stopping the indicator arm at the correct reading on the dial.

In Fig. 16 is shown a testing device attached to the speed registering apparatus, which testing device is for testing the accuracy of the speed registering apparatus whenever desired. The testing apparatus is shown in the lower half of Fig. 16, and the speed registering device is shown in the upper half thereof. This testing apparatus comprises a platform 225 mounted on suitable legs 226 and having rotatably mounted therein a shaft 227 carrying at its upper end a contact arm 228, and having fixed at its bottom end a pulley 229 having a circumferential groove in which runs a belt 230 driven by a smaller groove pulley 231 from a constant speed motor 232. Fixed upon the top of table 225 is a switch AA having the upwardly extending angular contact fingers 219 and 220. Also mounted below said table with a face to extend thereabove is a revolution counter 236. Also fixed at the top of said table at a predetermined distance from switch AA and in a circular path with relation thereto, is a second switch AB having upwardly and angularly positioned contact fingers 237, 238. Table 225 is formed in said circular path with a slot 239 in which is adjustably mounted a third switch AC which is provided with any suitable fastening means to enable the same to be securely fixed at any desired position along the length of said circular groove 239.

Switch AC is, like the other two switches referred to above, formed with upwardly extending angularly positioned contact fingers 240, 241. Contact arm 228 extends radially a sufficient distance to wipe over each of the uppermost contact fingers 219, 237 and 240 as this contact arm rotates in a circular path on shaft 227, as will be later more fully explained. Secured on a suitable panel 242 below table 225 of insulating and non-magnetic material is a stationary electromagnet 215 having pivotally mounted therebelow an armature latch 222 adapted to hold arm 243 to the left except when said latch is moved upwardly by attraction from electromagnet 215, and arm 243 moved to the right by spring 244. Arm 243 is pivoted to said panel or a support mounted thereon by a pin 245 and carries the extension 246 extending to the right, and has fixed thereto near the upper end of the left-hand side a contact member 213 of an electric switch. Fixed to the right-hand side of arm 243 at a distance preferably somewhat below that of contact arm 213, is a contact arm 223. Associated with contact arm 213 is a stationary contact arm 212, while associated with contact arm 223 is a stationary contact arm 224.

Slidably mounted in keeper 247 is a vertical bar carrying at its upper end the head 248 inclined on one edge so that when this head moves upwardly a sufficient distance it can rock arm 243 to the left against the pull of spring 244 and restore it to its position shown in Fig. 16, when armature latch 222 is released to drop down upon deenergization of electromagnet 215. Pivoted at 249 to the bar carrying head 248 is a lever 250 pivoted to the panel at 251, this lever being pivoted at 252 to the vertically slidable rod 253 slidable in keeper 254 secured to panel 242. The upper end of rod 253 slides through an opening in table 225, and is provided at its upper end with a finger button 255. The parts just described are similar to corresponding parts previously described in the left-hand portion of the control devices shown in Fig. 5, as will be readily understood from a comparison of these two figures of the drawings. Also associated with table 225 is a thirty-six volt battery A and a six volt battery B.

The wiring of the testing apparatus shown in the lower half of Fig. 16 will be later more fully described, and comprises in general three wires 256, 257 and 258 extending outwardly from the apparatus and connected to a suitable plug 20' similar to the plug 20 shown in Fig. 2, and a second group of wires 259, 260 and 261 leading to a plug 30' similar to the plug 30 leading from the batteries shown in Fig. 5.

The plug 20' is provided with three contact fingers adapted to be inserted into three corresponding openings in socket 24 of the cabinet shown in Fig. 3, while the plug 30' is formed with three contact fingers adapted to be inserted in corresponding openings in the socket 31 of the cabinet shown in Fig. 3.

As has been described earlier herein and as shown in the fragment of a table shown in Fig. 12, the various values for an automobile passing over two road switches spaced ten feet apart are readily computable with accuracy. The switches AA and AB may be spaced apart any desired distance but the switch AC is made adjustable in the circular slot 239 so that it may be adjusted to any desired angular position within the limits of the slot, so as to be capable of being set for different speeds and fixed for any one of such speeds as may be previously decided upon. As will be understood in Fig. 12, any number of speeds desired under the fixed conditions of the apparatus and distance apart of the road switches may be figured and tabulated, even though only five of such speeds and tabulations have been shown for convenience in Fig. 12.

Assuming the switch AC set the desired number of angular degrees for the desired speed for which the registering apparatus is to be tested, and said switch fixed in that position in slot 239, constant rotation of shaft 227 at a uniform speed will first close the contact fingers of switch AA to close switch 223, 224, so that the parts will be so set that when switch AB is closed current will flow through it to the control device, motor and constantly rotating electromagnet so as to energize the windings of said rotating electromagnet of the registering apparatus. In other words, switch AA is to so position the parts as to be ready when switch AB is later closed so that said winding will be energized to clutch the clutch 70 against the rotating electromagnet which action, as will be understood, takes place upon closing of switch AB, which occurs when arm 228 passes thereover. With the winding of the rotating electromagnet now energized, the dial 79 of the registering apparatus will continue to rotate until said winding of the rotating electromagnet is deenergized, which takes place when arm 228 closes switch AC. With the latter switch properly positioned in slot 239 in accordance with the arithmetic calculations previously referred to for the speed desired to be tested in the registering apparatus, it will be understood that arm 228 will first contact switch AA to properly position the parts so that when arm 228 closes switch AB the dial of the registering apparatus will be started, and when arm 228 closes switch AC said dial will instantly stop and if it reads for the speed at which switch AC is set according to said calculations, this proves that the dial of the registering apparatus is correct.

The electrical circuits to bring these various stops into operation will now be described. The circuit closed when switch AA is closed by arm 228, and starting from switch AA comprises line 218 extending from and having electrical contact with the upper contact finger 219, thence through switch 217 (for opening or closing the circuit by hand), thence through line 216, stationary electromagnet 215, line 214, switch 212, 213, line 211, line 210, through battery A, and through line 221 back to contact finger 220 of switch AA, thus completing the circuit. As will be understood, when arm 228 wipes over contact finger 219 switch AA will be momentarily closed, thus momentarily closing said circuit, after which contact finger 219 due to its resiliency will automatically move to open position. The result of closing this circuit momentarily is to energize stationary electromagnet 215 to cause armature latch 222 to move upwardly thereagainst to release arm 243 to move to the right under spring 244 and open switch 213, 212 and close switch 223, 224.

When arm 228 in moving in a counter-clockwise direction passes over switch AB, it momentarily closes the same and closes the following circuit. Starting from the uppermost contact finger 237 the electric current passes through lines 262, 263 through switch 223, 224 (now closed as a result of closing switch AA), lines 264, 257, connection 22, line b, connection y, through lines 260, 265, 266, 210, through battery A, then back through lines 267, 268, 269, connection z, line h, through safety switch 84, 85, through lines i, p, 146, through stationary electromagnet 104, line 109, switch 128, 130, through line j, through connection 21, through line 256, and back to contact finger 238 of switch AB, thus closing the circuit. This releases the armature latch 112 and causes arm 122 to move to the right as viewed in Figs. 5 and 16, thus opening switch 128, 130 and closing switch 140, 142.

The closing of switch 140, 142 closes another circuit which energizes the windings of the rotating electromagnet 56, as will now be explained. Line p, 146, being a live line, current will flow from line 146 through switch 140, 142 through line 144, switch 135, 137, lines t', s, 69, through brush 67 and winding 55 of the rotating electromagnet, out through brush 66, line 68 to wire q, to connection 22, then through wire b to connection y, then through lines 260, 266, 210, through battery A, through lines 267, 268, 269, connection z, through line h, safety switch 84, 85, lines i, p, and 146, thus completing the circuit, the result of which was to energize the winding of the rotating electromagnet 56 and close the clutch 70 to start indicator arm 79 into operation in synchronism with arm 228.

As arm 228 continues in its counter-clockwise rotation beyond switch AB, it will next contact switch AC and close the following circuit. Contact of arm 228 moves the upper contact finger 240 downwardly into contact with the lower contact finger 241 to close the switch. Current then flows from the contact arm 240 of switch AC through line 263, switch 223, 224, lines 264, 257, connection 22, line b, connection y, lines 260, 266, 210, battery A, lines 267, 268, 269, connection z, through line h, safety switch 84, 85, lines i, p, 146, stationary solenoid 105, line 109', switch 129, 131, line 300, connection 23, line 258 and back to the contact finger 241, thus completing the circuit. It will be understood that as soon as the stationary electromagnet 105 is energized this will immediately cause the armature latch 113 to move upwardly into contact with the electromagnet, thus releasing arm 123 to swing to the left, thus opening switch 129, 131 and switch 135, 137, the opening of the latter of which two switches breaks the circuit to the winding of the rotating electromagnet, and thus instantly stops the clutch 70 from rotation and stops movement of the indicator arm 79. If the indication of the indicator arm 79 on the dial is the same as the speed for which the switch AC in the testing apparatus is set for, this indicates that the registering apparatus is operating correctly.

Referring to the testing apparatus, there should also be kept in mind the importance of the testing apparatus to the registering device because in looking at Fig. 5 a push coil spring 91 is shown. It is known that the upward push of spring 91 must be overcome by the magnetic pull on the steel disc 70. Then it will be understood that the slightest variation in the strength of spring 91, will affect the suddenness or time required for the closing of the magnetic clutch, disc 70 and 48. (Remembering that a delay of one-thousandth of one second will cause an incorrect registration at high speeds).

Hardly any two springs may be had of the exact pushing power. Therefore, it becomes necessary to set the dial of each individual registering device by means of the testing apparatus. It is done as follows: Connect the two machines as shown together with battery circuits. Set the contactor AC 49.1126 degrees around the circle from the contactor AB. This will be seen to be the highest speed used in the shown calibrations or 100 miles per hour. Then start both devices in motion, close the switch 217 and if there is the exact amount of pressure from the spring 91 upward, then the registration will be 100 miles per hour on the speed register. If the exact pressure cannot be obtained from the spring 91 then it is necessary to move the dial shown in Fig. 11 in a clockwise direction or until the figure 100 on the dial is directly in line with the indicator 79.

The dial is then secured at that point and the slight loss of time in the clutch closing will apply equally at any or all speeds, and this loss having been taken care of by the dial having been moved, then all registrations will be correct. This is an important feature of the testing apparatus. This setting needs be done only once and that is when the machine is assembled and not for each registration of speed.

If desired to operate the combined testing and registering apparatus when the automobile or the like is moving along the highway in the opposite direction from that described above, all that is necessary is to reverse the plug 20' in Fig. 16 by turning it through 180 degrees from the position described earlier herein and then plugging it into the socket 24.

While I have shown and described my invention as involving two spaced apart road switches, I wish it understood that any suitable means for controlling suitably spaced apart switches other than road switches such as I have described, may be used if desired. For example, my invention may be used in conjunction with two electric eyes or photo cells. These electric eyes or beams would replace the described road switches, the beams being placed ten feet apart at right angles to the direction of traffic and when either beam is interrupted an electric circuit will be closed to the registering device, as is otherwise accomplished by the tire compressing the road switch. The frontmost part of the vehicle would interrupt the ray beam.

Attention is called to the importance of the means used for closing and opening the electric circuit to the windings of the rotating electromagnet, and the manner in which the circuit is broken to the road switches so instantaneously that before the tire has left the road switch the circuit has been broken within the device itself and thereby has accomplished two important results, first, it eliminates the possibility of interference from the second tire of the vehicle at even the highest speeds imaginable and, second, that the heat from the arc when the high voltage circuit is broken is taken by the ignition points within the device and is not taken within the road switch where proper ignition points could not be used. Such arc, if occurring in the road switch, would soon destroy the metal in the road switch if the circuit were broken at that point. Such arc should not be permitted at any other point than the ignition points within the device.

Having now described my invention, I claim:

1. In apparatus for registering the speed of cars and the like, in combination, a pair of spaced road switches, a constant speed motor, a constant speed rotatable electromagnet driven by said motor, a clutch and indicator arm fixed for rotation together when the clutch is in clutching engagement with the rotating electromagnet and held against rotation when the clutch is released, the clutch and the indicator arm being separate and apart from the rotating electromagnet when the clutch is released, and means for energizing the rotating electromagnet to grip the clutch when the first road switch is closed and to deenergize said electromagnet and release the clutch when the second road switch is closed, wiring circuits connected to each of said road switches and including said motor and electromagnet, said circuits and parts being so constructed and arranged that the indicator arm will operate correctly regardless of which longitudinal direction the car is travelling over the road switches.

2. In apparatus for registering the speed of cars and the like, in combination, a pair of spaced road switches, a constant speed motor, a constant speed rotatable electromagnet driven by said motor, a clutch and indicator arm fixed for rotation together when the clutch is in clutching engagement with the rotating electromagnet and held against rotation when the clutch is released, the clutch and the indicator arm being separate and apart from the rotating electromagnet when the clutch is released, means for energizing the rotating electromagnet to grip the clutch when the first road switch is closed and to deenergize said electromagnet and release the clutch when the second road switch is closed, wiring circuits connected to each of said road switches and including said motor and electromagnet, said circuits and parts being so constructed and arranged that the indicator arm will operate correctly regardless of which longitudinal direction the car is travelling over the road switches, and brake means for instantly stopping further rotation of the clutch and indicator arm upon deenergization of the electromagnet.

3. In speed registering apparatus in combination, a first road switch and a second road switch, said road switches being spaced apart a predetermined distance, a rotatable constant speed electromagnet, means for energizing said electromagnet upon closing the first road switch and deenergizing it upon closing the second road switch, a magnetizable central core in said electromagnet, an electrical winding around said core, a rotatable armature clutch normally spaced from one end of said core and concentric therewith, an indicator arm fixed to rotate with said clutch, said clutch being outside of and longitudinally spaced from the end of the electromagnet when the latter is deenergized, said clutch and indicating arm being both fixed to a rotatable and longitudinally movable shaft located entirely outside of said electromagnet.

4. In speed registering apparatus in combination, a first road switch and a second road switch, said road switches being spaced apart a predetermined distance, a rotatable constant speed electromagnet, means for energizing said electromagnet upon closing the first road switch and deenergizing it upon closing the second road switch, a magnetizable central core in said electromagnet, an electrical winding around said core, a rotatable armature clutch normally spaced from one end of said core and concentric therewith, an indicator arm fixed to rotate with said clutch, said clutch being outside of and longitudinally spaced from the end of the electromagnet when the latter is deenergized, and brake means engaging said clutch to instantly stop rotation of the clutch upon said deenergization, said first mentioned means comprising a pair of oscillatable arms having switches for controlling the energizing and deenergizing of the electromagnet, and electric circuits comprising said road switches, said oscillatable arms and said winding around said core, one of said oscillatable arms being operated upon closing of first road switch, and the other oscillatable arm being operated upon closing of the second road switch.

5. In speed registering apparatus in combination, a pair of road switches spaced apart a predetermined distance, registering apparatus comprising a constant speed rotatable electromagnet, a rotatable armature clutch spaced a slight distance from one end of said electromagnet, an indicator arm fixed to said clutch to rotate therewith when the rotatable electromagnet is energized, a pair of stationary electromagnets, each having a movable arm associated therewith, each of said arms carrying a switch on each side, one of said last mentioned switches when closed causing energization of its associated stationary electromagnet to free its associated arm for movement to open one of the last mentioned switches and close the other to energize the winding of the rotatable electromagnet and close the clutch to rotate the indicator arm, and one of the switches of the other movable arm when opened opening the circuit to the rotatable electromagnet to deenergize the same, release the clutch and stop rotation of the indicator arm, and a safety switch to prevent rotation of said indicator arm an excessive amount.

6. In speed registering apparatus, a rotatable electromagnet, an armature clutch for gripping engagement with the electromagnet when the winding of the latter is energized and released therefrom when deenergized, an indicator arm fixed to rotate with the clutch, a pair of road switches spaced a predetermined distance apart, control means having movable parts for energizing said electromagnet when a car front tire is passing over the first road switch and to deenergize the same when a car front tire is passing over the second road switch, a gear fixed to said electromagnet to rotate therewith, a second gear having a projection adapted to engage the first mentioned gear, a stationary electromagnet, an electric circuit opened and closed to said stationary electromagnet by operation of said gears and moving the second gear laterally when the projection engages the first mentioned gear, and means for restoring said control means to their initial position for another operation upon closing of said circuit.

7. In speed registering apparatus, a rotatable electromagnet, an armature clutch for gripping engagement with the electromagnet when the winding of the latter is energized and released therefrom when deenergized, an indicator arm fixed to rotate with the clutch, a pair of road switches spaced a predetermined distance apart, control means having movable parts for energizing said electromagnet when a car front tire is passing over the first road switch and to deenergize the same when a car front tire is passing over the second road switch, a gear fixed to said electromagnet to rotate therewith, a second gear, a stationary electromagnet, an electric circuit opened and closed to said stationary electromagnet by operation of said gears, said second gear being movable laterally, and means for restoring said control means to their initial position for another operation upon closing of said circuit, said second gear having an enlarged tooth, and means associated with the second gear for closing said circuit when said enlarged tooth engages the teeth of the first mentioned gear.

8. In speed registering apparatus in combination, a pair of road switches spaced apart a predetermined distance, registering apparatus comprising a constant speed rotatable electromagnet, a rotatable armature clutch spaced a slight distance from one end of said electromagnet, an indicator arm fixed to said clutch to rotate therewith when the rotatable electromagnet is energized, a pair of stationary electromagnets, a movable arm associated with each of said stationary electromagnets, each of said arms carrying a switch on each side, a pair of electric circuits each including one of said road switches and one of said stationary electromagnets, a circuit including said rotatable electromagnet, one of the switches on one of said arms when closed closing the circuit to its stationary electromagnet to free said last mentioned arm for movement to open said last mentioned switch and close the other switch on the last mentioned arm to energize the circuit to the rotatable electromagnet and close the clutch to rotate the indicator arm; and one of the switches of the other movable arm when opened opening the circuit to the rotatable electromagnet to deenergize the same, release the clutch and stop rotation of the indicator arm.

9. In speed registering apparatus in combination, a pair of road switches spaced apart a predetermined distance, registering apparatus comprising a constant speed rotatable electromagnet, a rotatable armature clutch spaced a slight distance from one end of said electromagnet, an indicator arm fixed to said clutch to rotate therewith when the rotatable electromagnet is energized, a pair of stationary electromagnets, a movable arm associated with each of said stationary electromagnets, each of said arms carrying a switch on each side, a pair of electric circuits each including one of said road switches and one of said stationary electromagnets, a circuit including said rotatable electromagnet, one of the switches on one of said arms when closed closing the circuit to its stationary electromagnet to free said last mentioned arm for movement to open said last mentioned switch and close the other switch on the last mentioned arm to energize the circuit to the rotatable electromagnet and close the clutch to rotate the indicator arm; one of the switches of the other movable arm when opened opening the circuit to the rotatable electromagnet to deenergize the same, release the clutch and stop rotation of the indicator arm, and means for restoring the arms to their original setting to be in position for another operation of the indicator arm.

10. In speed registering apparatus in combination, a pair of road switches spaced apart a predetermined distance, registering apparatus comprising a constant speed rotatable electromagnet, a rotatable armature clutch spaced a slight distance from one end of said electromagnet, an indicator arm fixed to said clutch to rotate therewith when the rotatable electromagnet is energized, a pair of stationary electromagnets, a movable arm associated with each of said stationary electromagnets, each of said arms carrying a switch on each side, a pair of electric circuits each including one of said road switches and one of said stationary electromagnets, a circuit including said rotatable electromagnet, one of the switches on one of said arms when closed closing the circuit to its stationary electromagnet to free said last mentioned arm for movement to open said last mentioned switch and close the other switch on the last mentioned arm to energize the circuit to the rotatable electromagnet and close the clutch to rotate the indicator arm; one of the switches of the other movable arm when opened opening the circuit to the rotatable electromagnet to deenergize the same, release the clutch and stop rotation of the indicator arm, and means for restoring the arms to their original setting to be in position for another operation of the indicator arm, said last mentioned means being automatically operated by the rotatable electromagnet.

11. In speed registering apparatus in combination, a pair of spaced road switches controlled by a passing vehicle, a rotary electromagnet, an indicator clutch operable to gripping contact with said rotary electromagnet when the latter is energized, a pair of movable elements, a pair of electrical switches associated with each movable element, one of said electrical switches of each pair being connected in circuit with one of said road switches, and the other connected in circuit with the rotary electromagnet, the first mentioned one of said electrical switches being opened upon closing its road switch to prevent arcing of the road switch when opened, and then instantly closing the said other electrical switch to energize the rotary electromagnet.

12. In speed registering apparatus in combination, a pair of road switches spaced apart a predetermined distance, a first movable member having a first switch and a second switch, a second movable member having a switch, a source of electrical energy, a rotatable electromagnet, a first circuit from the first road switch through the source of energy, through the first switch on the first movable member and back to the first road switch, a second circuit from the source of energy through the second switch on the first movable member, through the rotatable electromagnet and back to the source of energy, and a third circuit from the second road switch through the source of energy, through the switch on the second movable member and back to the second road switch, and means, upon closing the first road switch, to close the first circuit and instantly move the first movable member and close the second circuit to energize the rotatable electromagnet and simultaneously open the first circuit, and means, upon closing the second road switch, to close the third circuit and instantly open the second circuit and deenergize the rotatable electromagnet.

13. In speed registering apparatus in combination, a pair of road switches spaced apart a predetermined distance, a first movable member having a first switch and a second switch, a second movable member having a first switch and a second switch, a source of electrical energy, a rotatable electromagnet, a first circuit from the first road switch through the source of energy, through the first switch on the first movable member and back to the first road switch, a second circuit from the source of energy through the second switch on the first movable member, through the second switch on the second movable member, the rotatable electromagnet and back to the source of energy, and a third circuit from the second road switch through the source of energy, through the first switch on the second movable member and back to the second road switch, and means, acting when the first road switch is closed, to close the first circuit and instantly move the first movable member and close the second circuit to energize the rotatable electromagnet and simultaneously open the first circuit, and means, acting when the second road switch is closed, to close the third circuit and instantly move the second movable member and open the second circuit and deenergize the rotatable electromagnet and simultaneously open the third circuit.

14. In speed registering apparatus in combination, a pair of road switches spaced apart a predetermined distance, a first movable member having a first switch and a second switch, a second movable member having a first switch and a second switch, a source of electrical energy, a rotatable electromagnet, a first circuit from the first road switch through the source of energy, through the first switch on the first movable member and back to the first road switch, a second circuit from the source of energy through the second switch on the first movable member, through the second switch on the second movable member, the rotatable electromagnet and back to the source of energy, and a third circuit from the second road switch through the source of energy, through the first switch on the second movable member and back to the second road switch, and means, acting when the first road switch is closed, to close the first circuit and instantly move the first movable member and close the second circuit to energize the rotatable electromagnet and simultaneously open the first circuit, and means, acting when the second road switch is closed, to close the third circuit and instantly move the second movable member and open the second circuit and deenergize the rotatable electromagnet and simultaneously open the third circuit, a third switch on each of the first and second movable members, a conductor connecting the third switch of the second movable member and the second switch of the first movable member, a conductor connecting the second switch of the second movable member and the third switch of the first movable member, said last mentioned conductor being also connected to the source of energy, whereby the registering apparatus will operate correctly regardless of which longitudinal direction along the highway the car is proceeding.

15. In speed registering apparatus in combination, a pair of road switches spaced apart a predetermined distance, a first movable member having a first switch and a second switch, a second movable member having a first switch and a second switch, a source of electrical energy, a rotatable electromagnet, a first circuit from the first road switch through the source of energy, through the first switch on the first movable member and back to the first road switch, a second circuit from the source of energy through the second switch on the first movable member, through the second switch on the second movable member, the rotatable electromagnet and back to the source of energy, and a third circuit from the second road switch through the source of energy, through the first switch on the second movable member and back to the second road switch, and means, acting when the first road switch is closed, to close the first circuit and instantly move the first movable member and close the second circuit to energize the rotatable electromagnet and simultaneously open the first circuit, and means, acting when the second road switch is closed, to close the third circuit and instantly move the second movable member and open the second circuit and deenergize the rotatable electromagnet and simultaneously open the third circuit, and means for restoring the said two movable members to their original positions for another registering operation.

16. In speed registering apparatus in combination, a pair of road switches spaced apart a predetermined distance, a first movable member having a first switch and a second switch, a second movable member having a first switch and a second switch, a source of electrical energy, a rotatable electromagnet, a first circuit from the first road switch through the source of energy, through the first switch on the first movable member and back to the first road switch, a second circuit from the source of energy through the second switch on the first movable member, through the second switch on the second movable member, the rotatable electromagnet and back to the source of energy, and a third circuit from the second road switch through the source of energy, through the first switch on the second movable member and back to the second road switch, and means, acting when the first road switch is closed, to close the first circuit and instantly move the first movable member and close the second circuit to energize the rotatable electromagnet and simultaneously open the first circuit, and means, acting when the second road switch is closed, to close the third circuit and instantly move the second movable member and open the second circuit and deenergize the rotatable electromagnet and simultaneously open the third circuit, a third switch on each of the first and second movable members, a conductor connecting the third switch of the second movable member and the second switch of the first movable member, a conductor connecting the second switch of the second movable member and the third switch of the first movable member, said last mentioned conductor being also connected to the source of energy, whereby the registering apparatus will operate correctly regardless of which longitudinal direction along the highway the car is proceeding, and means for restoring the first movable member and the second movable member to their original position for another registering operation.

17. In a speed registering apparatus in combination, a pair of road switches spaced apart a predetermined distance, a pair of stationary electromagnets each having a latch, a movable arm adjacent each of said stationary electromagnets, each of said arms having a plurality of switches, a constant speed rotatable electromagnet, a clutch and indicator arm to be rotated with the rotatable electromagnet when the latter is electrically energized, said stationary electromagnets, movable arms, arm switches and connections being symmetrically arranged so that the rotatable electromagnet and indicator arm will register the speed of an object passing from one of said road switches to the other regardless of which direction substantially at right angles to the length of the road switches the object is proceeding.

18. In apparatus for registering the speed of passing objects, in combination a first initiating switch and a second initiating switch, said switches being spaced apart a predetermined distance, a rotatable constant speed electromagnet, means for energizing said electromagnet upon closing of either initiating switch and deenergizing it upon closing of the other initiating switch regardless of the order of closure of these switches, a rotatable armature clutch normally spaced from one end of said electromagnet, an indicator arm fixed to rotate with said clutch, said clutch being outside of and longitudinally spaced from the end of the electromagnet when the latter is deenergized, said clutch and indicating arm being both fixed to a rotatable and longitudinally movable shaft located entirely outside of said electromagnet.

19. In apparatus for registering the speed of passing objects, in combination, a pair of spaced apart road switches, a constant speed rotatable electromagnet, a rotatable armature clutch normally spaced longitudinally from said electromagnet but movable into gripping position therewith upon electrical energization of the electromagnet, a shaft fixed to said clutch, an indicator arm fixed to said shaft, resilient means for normally urging the clutch away from the electromagnet when the latter is deenergized, a brake for said clutch, resilient means for normally rotating the indicator arm back to its starting position upon release of said brake, an electric circuit including one of said road switches and said electromagnet, another electric circuit including the other road switch and said electromagnet, and means for closing its respective circuit and energizing the rotatable electromagnet by the closing of the first road switch encountered by the passing object regardless of which direction the object is travelling.

20. In apparatus for registering the speed of passing objects, in combination, a pair of spaced apart initiating switches adapted to be consecutively closed by a passing object, a constant speed rotatable electromagnet, a rotatable armature clutch normally spaced apart from said electromagnet but movable into gripping position therewith upon electrical energization of the electromagnet, an indicator arm fixed to rotate with said clutch, a stationary electromagnet having associated therewith a movable armature latch, a spring pressed movable arm releasably held by the armature latch, a first switch and a second switch associated with said arm, each of said arm switches being open when the other is closed, the first one of said initiating switches that is closed by a passing object when the first arm switch is closed and the second arm switch open causing the stationary electromagnet to be energized to move its armature latch to free the arm to move and open the first arm switch and close the second arm switch to energize the winding of the rotatable electromagnet to close the clutch and start the indicator arm, and means for de-energizing the rotatable electromagnet and stopping the indicator arm upon closing of the second initiating switch.

21. In apparatus for registering the speed of passing objects, in combination, a pair of spaced apart initiating switches adapted to be consecutively closed as an object passes thereover, a constant speed rotatable electromagnet, an indicator arm movable upon energization of the electromagnet and instantly stoppable upon deenergization of the electromagnet, a pair of stationary electromagnets each having an armature latch and a swingable arm having two switches, and circuits and connections between said initiating switches, rotatable electromagnet, stationary electromagnets, latches and swingable arms, such that when the passing object is passing over the initiating switches in one direction the first one closed will energize one of the stationary electromagnets to move its latch, release its arm and close one of its switches to energize the rotatable electromagnet, close the clutch and rotate the indicator arm, and when the object is passing over the initiating switches in the opposite direction the first one closed will energize the other stationary electromagnet to move its latch, release its arm and close one of its switches to energize the rotatable electromagnet, close the clutch and rotate the indicator arm, either of said stationary electromagnets being deenergized when the other one is energized.

22. In apparatus for registering the speed of a passing object, a pair of spaced apart initiating switches adapted to be consecutively closed as the object passes thereover, a constant speed rotatable electromagnet, an indicator arm movable upon energization of the electromagnet and instantly stoppable upon deenergization of the electromagnet, stationary electromagnet means connected in circuits with the initiating switches and the rotatable electromagnet and so constructed and arranged that when either one of the initiating switches is closed by the passing object the rotatable electromagnet will be energized and move the indicator arm, and when the other initiating switch subsequently is closed by the passing object the rotatable electromagnet will be deenergized and stop the indicator arm, regardless of which direction the object is passing over the initiating switches.

23. In apparatus for registering the speed of a passing object, a pair of spaced apart initiating switches adapted to be consecutively closed as the object passes thereover, a constant speed rotatable electromagnet, an indicator arm movable upon energization of the electromagnet and instantly stoppable upon deenergization thereof, a first stationary electromagnet in a circuit including one of the initiating switches, a second stationary electromagnet in a circuit including the other initiating switch, the rotatable electromagnet being in a third circuit in parallel with both stationary electromagnets and both initiating switches, said stationary electromagnets having means whereby when one of the initiating switches is closed by the passing object this closed initiating switch will become dead and connection be instantly made to the rotatable electromagnet circuit and energize the rotatable electromagnet and when the other initiating switch is closed by the passing object this last mentioned switch will become dead and the circuit to the rotatable electromagnet be instantly opened to deenergize it, regardless of which direction the object is passing over the initiating switches.

24. In apparatus for registering the speed of a passing object, a pair of spaced apart initiating switches, a constant speed rotatable electromagnet, an indicator arm movable upon energization of the electromagnet and instantly stoppable upon deenergization thereof, a first stationary electromagnet in a circuit including one of the initiating switches, a second stationary electromagnet in a circuit including the other initiating switch, the rotatable electromagnet being in a third circuit, said stationary electromagnets having means whereby when one of the initiating switches is closed by the passing object connection will be made to close the rotatable electromagnet circuit and energize the rotatable electromagnet and when the other initiating switch is closed by the passing object the circuit to the rotatable electromagnet will be opened to deenergize it, regardless of which direction the object is passing over the initiating switches.

ERNEST J. DOWDEN.